US010885092B2

(12) United States Patent
Cruz Huertas et al.

(10) Patent No.: US 10,885,092 B2
(45) Date of Patent: Jan. 5, 2021

(54) MEDIA SELECTION BASED ON LEARNING PAST BEHAVIORS

(71) Applicant: INTERNATIONAL BUSINESS MACHINES CORPORATION, Armonk, NY (US)

(72) Inventors: Luis Carlos Cruz Huertas, San Pedro (CR); Rick A. Hamilton, II, Charlottesville, VA (US); Hari K. Narasimhamurthy, Chantilly, VA (US); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 15/954,866

(22) Filed: Apr. 17, 2018

(65) Prior Publication Data

US 2019/0318008 A1 Oct. 17, 2019

(51) Int. Cl.
*G06F 16/00* (2019.01)
*G06F 16/435* (2019.01)
*G06N 5/02* (2006.01)
*G06F 16/438* (2019.01)

(52) U.S. Cl.
CPC ........ *G06F 16/435* (2019.01); *G06F 16/4387* (2019.01); *G06N 5/02* (2013.01)

(58) Field of Classification Search
CPC ...... G06F 16/435; G06F 16/4387; G06N 5/02
USPC ........................................................ 707/722
See application file for complete search history.

(56) References Cited

U.S. PATENT DOCUMENTS

| 6,987,221 | B2 | 1/2006 | Platt |
| 7,111,009 | B1 | 9/2006 | Gupta et al. |
| 7,345,232 | B2 | 3/2008 | Toivonen et al. |
| 8,028,038 | B2 | 9/2011 | Weel |
| 8,045,952 | B2 | 10/2011 | Qureshey et al. |
| 8,370,351 | B2 | 2/2013 | Kalasapur et al. |

(Continued)

OTHER PUBLICATIONS

ITunes, "Create a Smart Playlist," iTunes for Mac, Jan. 12, 2018, p. 1-2, Apple Inc., https://support.apple.com/kb/PH19487?locale=en_US, Accessed on Apr. 9, 2018.

(Continued)

*Primary Examiner* — Monica M Pyo
(74) *Attorney, Agent, or Firm* — Robert R. Aragona

(57) ABSTRACT

A method, computer system, and a computer program product for selecting a media playlist based on learning past behaviors of a user is provided. The present invention may include receiving a plurality of current user data. The present invention may then include receiving a plurality of current external conditions data. The present invention may also include enriching a plurality of current raw data associated with the plurality of current user data, the plurality of user reactions to the media selections and the plurality of current external conditions data. The present invention may further include determining the plurality of current user data exceeds a threshold. The present invention may also include, in response to determining the threshold is exceeded, creating a dataset. The present invention may then include retrieving a media playlist. The present invention may further include sending the retrieved media playlist to a media device.

17 Claims, 6 Drawing Sheets

(56) References Cited

U.S. PATENT DOCUMENTS

| | | | |
|---|---|---|---|
| 9,031,857 B2* | 5/2015 | Angell | G06Q 30/0271 |
| | | | 705/14.52 |
| 9,031,858 B2* | 5/2015 | Angell | G06Q 30/02 |
| | | | 705/14.52 |
| 2015/0268800 A1 | 9/2015 | O'Konski et al. | |
| 2015/0317353 A1 | 11/2015 | Zavesky | |
| 2015/0356447 A1 | 12/2015 | Lowe et al. | |
| 2016/0196504 A1* | 7/2016 | Allen | G06N 20/00 |
| | | | 706/11 |

OTHER PUBLICATIONS

Mell et al., "The NIST Definition of Cloud Computing," National Institute of Standards and Technology, Sep. 2011, p. 1-3, Special Publication 800-145.

* cited by examiner

MEDIA SELECTION BASED ON LEARNING PAST BEHAVIORS

BACKGROUND

The present invention relates generally to the field of computing, and more particularly to data processing.

People listen to different kinds of media according to their location, the activities they are performing, their mood, cognitive status, or other context related factors. Places, such as a gym or book stores, assume people like the same kind of music, and phones and personal devices lack the intelligence to personalize playlists at this point.

SUMMARY

Embodiments of the present invention disclose a method, computer system, and a computer program product for selecting a media playlist based on learning past behaviors of a user. The present invention may include receiving a plurality of current user data associated with the user from a user device, wherein the received plurality of current user data associated with the user includes a plurality of user reaction data to a plurality of media selections corresponding with the user. The present invention may then include receiving a plurality of current external conditions data associated with the user from the user device. The present invention may also include enriching a plurality of current raw data associated with the received plurality of current user data, the received plurality of user reactions to the plurality of media selections and the received plurality of current external conditions data. The present invention may further include determining the received plurality of current user data exceeds a threshold associated with the user. The present invention may also include, in response to determining that the received plurality of current user data exceeds the threshold, creating a dataset based on the determined plurality of current user data based on the exceeded threshold associated with the user. The present invention may then include retrieving, from a records of learned user preferences and behaviors database and a combination of external digital devices, a media playlist based on the determined plurality of current user data exceeding the threshold associated with the user, wherein the retrieved media playlist alters the received plurality of current user data. The present invention may further include sending the retrieved media playlist to a media device associated with the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
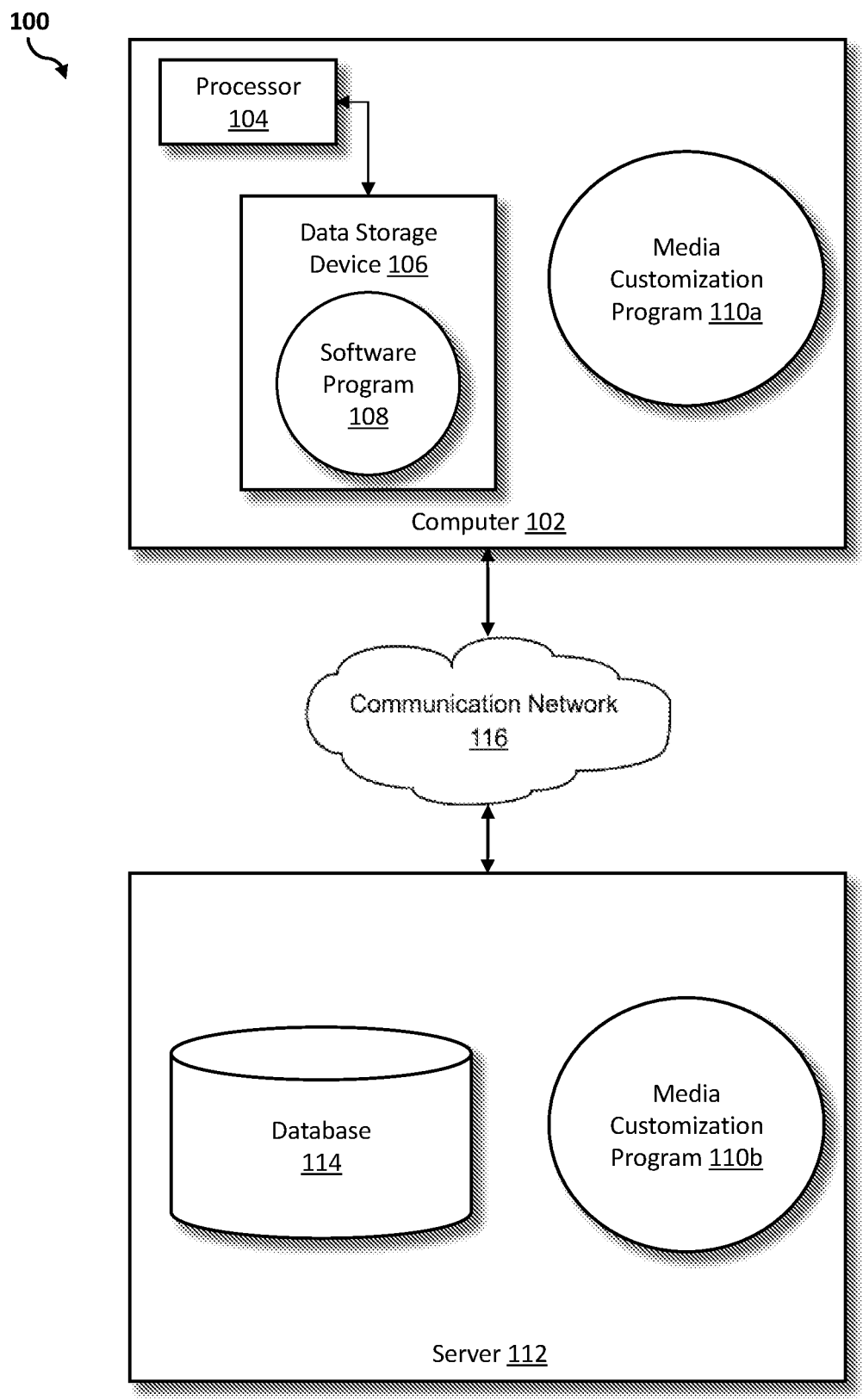
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for randomly selecting media based on learning past behaviors of a user and external conditions. As such, the present embodiment has the capacity to improve the technical field of data processing by assessing a user's interests and media selections based on the user's past behaviors. More specifically, the media customization program may learn characteristics of when a user prefers a certain musical genre, and then the media customization program may offer music to match those musical genres when the conditions are replicated.

As previously described, people listen to different kinds of media according to their location, the activities they are performing, their mood, cognitive status, or other context related factors. Places, such as a gym or book stores, assume people like the same kind of music, and phones and personal devices lack the intelligence to personalize playlists at this point.

Therefore, it may be advantageous to, among other things, assess a user's interests and media selections based on past behaviors and foreign data from sources (e.g., GPS, sensor movement). Specifically, the media customization program may learn characteristics of when a user prefers certain genres of music, then offer music to match those genres when those conditions are replicated. For instance, the media customization program may base key decisions on reinforcement learning and K-nearest neighbors that can adapt to items such as location-based services, accelerometer readings, or other parameters, to better match a user's tastes and change the user status.

According to at least one embodiment, the media customization program may be able to learn user behaviors based on media played according to the context (e.g., location, user activity, weather, date/time, cognitive state) and based on context may intelligently propose songs liked by the user or similar to the media element liked by the user depending on the detected context. The provided functions of the media customization program save the user from continuously shifting between songs and creating playlists. The present embodiment may include the optimization of the streaming of media files for those songs that are more probable to be played based on the context.

According to at least one embodiment, the media customization program may intelligently create a custom playlist or select musical genres based on: (1) identified current location, user data (e.g., user activity, user's mood, cognitive status) (i.e., singularities), context and environmental conditions; (2) previously learned media preferences of the user while in different places and/or doing different activities, mood, cognitive status, context and environmental conditions; and (3) matched similar media to the learned media preferences by location and/or activity, mood, cognitive status, context and environmental conditions. The present embodiment may utilize the inclusion of media to the playlist to avoid the user's anatomical functions or systems from exceeding a certain threshold. The media customization program may include, for example, incorporating music with softer bass in a playlist when the user's heartbeat rate is beyond a recommended rate.

According to at least one embodiment, the media customization program may provide a selective playlist including a database of media from several data sources depending on the media subscription for a specified user, and records of play activity for the user by location, activity, mood, cognitive status, context and environmental conditions. Additionally, the selective playlist may include processing means adapted to assess the characteristics of one or more songs played in a location or while doing an activity or while the user is in a certain identified mood or cognitive status, in a determined context, or environmental condition. The present embodiment may include a means to determine playlist for current location, activity, mood, cognitive status, context or environmental conditions, according to the user preferences.

According to at least one embodiment, the media customization program may automate and assist the user in playlist creation by selecting songs that are more in line with the user's taste and preferences, optimizing media download for wanted or convenient music, and reducing song shifting for the user.

The present embodiment may include a training process. The training process may include a user enabling the playlist application on the user device. The user device may read the location and the accelerometer, and may attempt to identify the mood (from gestures or recent social media posts), cognitive status (from wearable sensor readings), determined context (date and time) and environmental conditions (weather and temperature). The media customization program may identify current location and activity based on readings of location and accelerometer, and reads the current media playing. The media customization program then may correlate location, type of location, accelerometer, type of activity, mood, cognitive status, context, environmental conditions and types or characteristics of media to train the media customization program to select media based on the learned past behavior of the user.

The present embodiment may also include a playlist creation process. The playlist creation process may include a user device reading the location and the accelerometer, and attempting to identify the mood (from gestures or recent social media posts), cognitive status (from wearable sensor readings), determined context (date and time) and environmental conditions (weather and temperature). The media customization program may then identify current location and activity based on readings. Then, the media customization program may search in learned data for characteristics/types of media related to current location, activity, mood, cognitive status and environmental conditions. The media customization program may then search personal media databases and services for songs matching characteristics and retrieve the resulting media.

According to at least one embodiment, the media customization program may include an extension (i.e., a pluggable component that can be added to existing media players). The extension may access several sensors and data services of the user device (e.g., phone), such as global positioning system (GPS) location, accelerometer, date/time reader, weather forecast application, user's reactions, gesture capture and media playing application. The extension may send the raw data to two other components on the cloud: Behavior Capture and Current Context Data Capture.

The present embodiment may include a Behavior Capture, which may be related to the training process. The Behavior Capture may build the correlation of the data to determine the user media preferences by location, activity, mood, cognitive status, context and environmental conditions (i.e., user listening behavior). The Behavior Capture may then update the training into the records of learned user preferences and behaviors database. However, the first action of the Behavior Capture may be to enrich the raw data coming from the extension to grow the correlation. For example, the Behavior Capture may determine the media (e.g., title, artist, genre, duration and language), location (e.g., gym, coffee shop, park, home, work), activity based on the location and accelerometer (e.g., exercise, reading, picnic), gestures (e.g., mood), and cognitive status (e.g., heartbeats associated with the historic behavior of sleeping and physical activity).

The present embodiment may include a Current Context Data Capture, which is related to the playlist creation process (i.e., playlist recommendation process). The Current Context Data Capture may utilize the raw data from the extension, and enrich that raw data (i.e., similar to the Behavior Capture) to send the enriched raw data as a dataset of the current user situation to the Customized Playlist Selection module. The Customized Playlist Selection module may query the records of learned user preferences and behaviors database with the current, enriched data. The search may then return media titles suitable for the current situation of the user. The titles may then be sent to the extension to deliver the list to the Media Player, which may stream the user suited playlist.

According to at least one embodiment, the media customization program may be a separate program, not integrated into another software program, for playing media. According to at least one other embodiment, the media customization program may function as an extension called by a native application to analyze the data on the user device that is associated with the context of the user. The user device may report data, and the streaming service may respond with learned behaviors.

According to at least one embodiment, the media customization program may include a learner (e.g., low level Artificial Intelligence (AI) system) that may intercept the data associated with user and the external conditions, as well as data generated by another application (i.e., native application) and the biometric sensors to influence the decision proposed on the user's preferred native application. The learner may act as an intermediation to recommend a singularity (e.g., user activity, user's mood, cognitive status) based on the user. As such, the learner may feed a stronger AI system located in a cloud server, as well as may intercept and gather (i.e., cluster) data by running a reinforcement and K-nearest neighbors algorithm to send a new dataset to the native application, avoiding advertisements or other disturbing media items. Instead, the user may be exposed to media items that are more focused on the singularity.

According to at least one embodiment, the media customization program may monitor the user's status, user activity and cognitive status (i.e., user data) by utilizing biometric sensors to determine the user's frustration level, heartbeat rate, respiratory breathing and temperature to propose media selections to alter the user's status or cognitive status thereby returning the user's status to a healthy or safe level for the user.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a media customization program 110a. The networked computer environment 100 may also include a server 112 that is enabled to run a media customization program 110-b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the media customization program 110a, 110-b may interact with a database 114 that may be embedded in various storage devices, such as, but not limited to a computer/mobile device 102, a networked server 112, or a cloud storage service.

According to the present embodiment, a user using a client computer 102 or a server computer 112 may use the media customization program 110a, 110-b (respectively) to customize media selections based on learning past behaviors of the user. The media customization method is explained in more detail below with respect to FIGS. 2 and 3.

Figure 2:
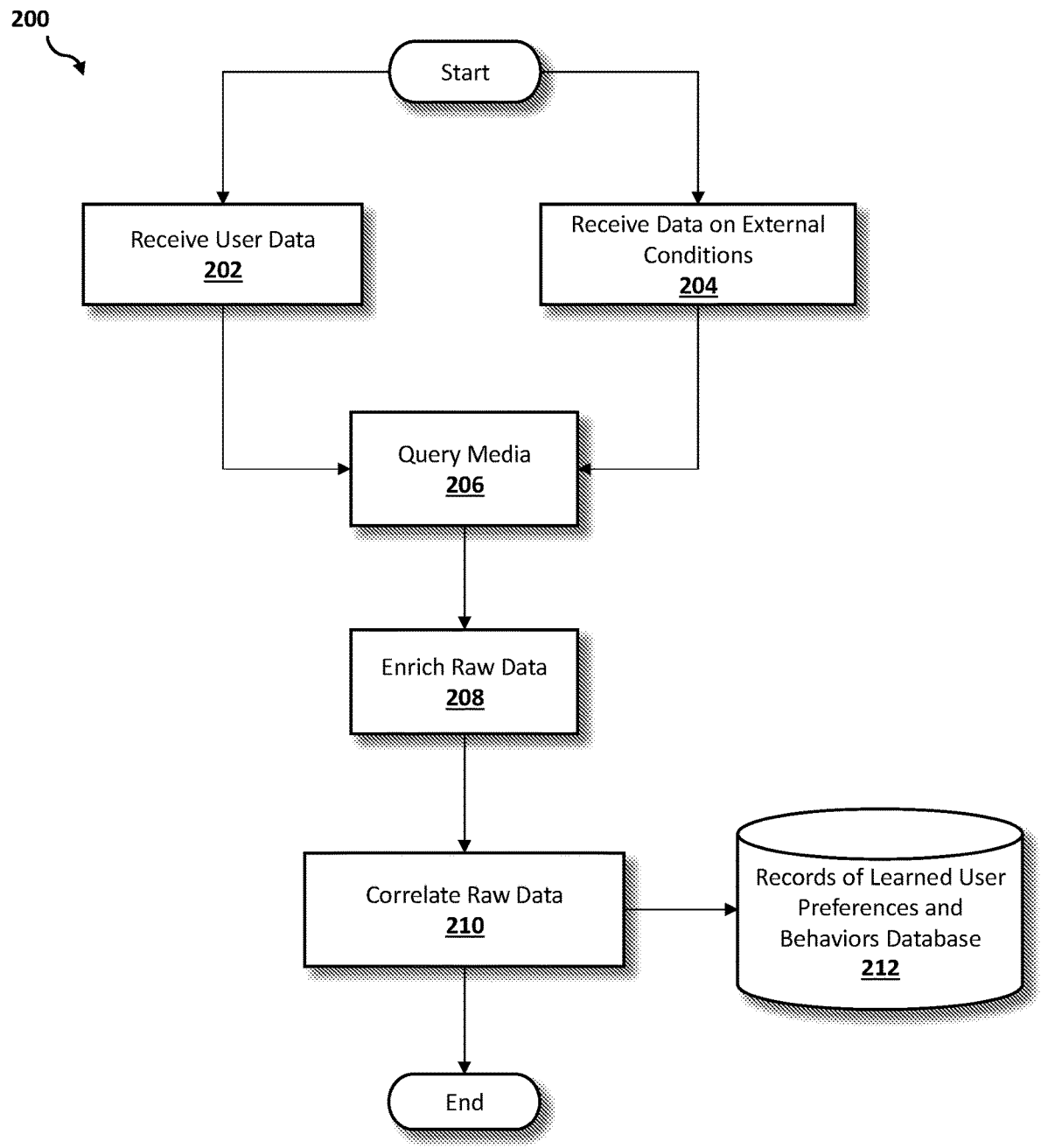
FIG. 2 is an operational flowchart illustrating a process for building a records of learned user preferences and behaviors database according to at least one embodiment.

Referring now to FIG. 2, an operational flowchart illustrating the exemplary records of learned user preferences and behaviors database building process 200 used by the media customization program 110a, 110-b according to at least one embodiment is depicted.

At 202, user data is received by the media customization program 110a, 110-b. Using a software program 108 on the user device (e.g., user's computer 102), user data (i.e., training user data) may be received as input, from wearable biometric sensors (e.g., watch, glasses), user gestures, user activity and/or recent social media posts, to the media customization program 110a, 110-b via communications network 116. The user data may include information pertaining to the user's mood, activity and cognitive status. For the user's cognitive status, the media customization program 110a, 110-b may utilize wearable biometric sensors associated with the physiological recognition (e.g., face, hand, iris and fingerprint) and behavioral recognition (e.g., voice, heartbeat rate, breathing rate). For the user's mood, the media customization program 110a, 110-b may utilize wearable biometric sensors associated with recognizing hand gestures and handwriting, as well as utilize recent social media posts associated with the user or by the user. For user activity, the media customization program 110a, 110-b may utilize wearable accelerometer and gyroscope sensors associated with the user.

For example, a user is wearing a fitness watch, which transmits the generated data, via Wi-Fi, to the user's smartphone. To generate data pertaining to the user's mood, the fitness watch includes sensors that monitor the user's hand gestures. To generate data associated with the user's activity, the fitness watch includes an accelerator and gyroscope sensors that monitor the user's motion. To generate data associated with the user's cognitive status, the fitness watch includes biometric sensors to monitor the user's voice (especially voice inflection, pitch and tone), heartbeat rate and respiratory breathing rate. The data generated from the fitness watch is transmitted, via Wi-Fi, to an API for the media customization program 110a, 110-b on the user's smartphone.

In another embodiment, the user may also manually input certain user data into the media customization program 110a, 110-b, without the use of biometric sensors or recent social media posts in case of a malfunction or lack of certain biometric sensors.

In the present embodiment, if the media customization program 110a, 110-b is unable to detect user data associated with the user's cognitive status and mood, then the media customization program 110a, 110-b may present an error message, guide the user to activate (i.e., turn on) a specific biometric sensor device, or present the identified malfunction (e.g., reason for the failure to detect) to the user. The media customization program 110a, 110-b may then continue to attempt to detect user data until the media customization program 110a, 110-b receives the adequate user data.

At 204, data on external conditions is simultaneously received by the media customization program 110a, 110-b. Using a software program 108 on the user device (e.g., user's computer 102), data on external conditions (i.e., training external conditions data) may be received as input, from wearable biometric sensors, application program interfaces (APIs) and/or recent social media posts, to the media customization program 110a, 110-b via communications network 116. The data on external conditions may include information pertaining to the user's location, context (e.g., date and time), and environmental conditions (e.g., weather and temperature). To determine the location of the user, the media customization program 110a, 110-b may access GPS and other data location tracking services on the user device. To determine context, the media customization program 110a, 110-b may utilize APIs on the user device. To determine environmental conditions, the media customization program 110a, 110-b may utilize APIs, recent social media posts associated with the user or by the user, and weather data tracking services on the user device.

Continuing the previous example, the user utilizes various APIs on the user's smartphone to generate data on the user's location, context and environmental conditions. To generate data on the user's location, the media customization program 110a, 110-b utilizes a GPS and recent social media posts on the user's smartphone. To generate data on the context, the media customization program 110a, 110-b utilizes the calendar and clock features on the user's smartphone. To generate data on the environmental conditions, the media customization program 110a, 110-b utilizes the weather forecast API.

In another embodiment, the media customization program 110a, 110-b may receive user data 202 and receive data on external conditions 204 consecutively. For example, the media customization program 110a, 110-b may receive user data 202 before the media customization program 110a, 110-b may receive data on external conditions 204, or the media customization program 110a, 110-b may receive data on external conditions 204 before the media customization program 110a, 110-b may receive user data 202.

In another embodiment, the user may also manually input certain data on external conditions into the media customization program 110a, 110-b, without the use of GPS, data tracking services, APIs or recent social media posts in case of a malfunction or the deactivation of data tracking services, APIs or GPS.

In the present embodiment, if the media customization program 110a, 110-b is unable to detect data on external conditions associated with the user's location, context and environmental conditions, then the media customization program 110a, 110-b may present an error message, guide the user to activate (i.e., turn on) a specific API, GPS or data tracking service, or present the identified malfunction (e.g., reason for the failure to detect) to the user. The media customization program 110a, 110-b may then continue to attempt to detect data on external conditions until the media customization program 110a, 110-b receives the adequate data on external conditions.

Then, at 206, the media is queried on the user device by the media customization program 110a, 110-b. Using a software program 108 on the user device (e.g., user's computer 102), media played (i.e., media selections or songs) may be received as input from a media player to the media customization program 110a, 110-b via communications network 116.

Continuing the previous example, the user selects classical music, primarily by the composers Mozart, Beethoven and Bach, to be played by the media player on the user's smartphone.

Then, at 208, the received data is enriched by the media customization program 110a, 110-b. The received user data, data on external conditions and media played (i.e., raw training data) may be received from the various biometric sensors, APIs, GPS, data tracking services and media player on the user device by an extension (i.e., a pluggable component that may be added to an existing media player). The extension may then send the raw data to a Behavior Capture component to enrich (i.e., interpret and categorize the raw data to determine the location, user's activity, mood and cognitive status) the received raw data associated with the user data (e.g., user's cognitive status, activity and mood), data on external conditions (e.g., location, context and environmental conditions), and media query. By enriching the raw data with the Behavior Capture component, the media customization program 110a, 110-b may interpret the raw data on the queried media (e.g., title, artist, genre, duration, language), location (e.g., gym, coffee shop, work, home, park), user's activity (e.g., exercising, walking, sitting, riding a bicycle), mood (e.g., expression) and cognitive status (e.g., anxious, tired, happy).

Continuing the previous example, the raw data generated on the user data, queried music and data on the external conditions from sensors on the user's fitness watch and APIs on the user's smartphone is enriched by the media customization program 110a, 110-b. The raw data from the sensors that monitor the user's hand gestures determine that the user is typing. The raw data from the accelerator and gyroscope sensors determine that the user is sitting. The raw data from the biometric sensors that monitor the user's voice (especially voice inflection, pitch and tone), heartbeat rate and respiratory breathing rate determine that the user's heartbeat rate and respiratory breathing rate are elevated and the user is anxious. The raw data on the external conditions determine that the user is in the user's office at work. The APIs on the user's smartphone determine that the room temperature is 70 degrees Fahrenheit and the date and time is Monday, Jun. 23, 2018 at eleven o'clock in the morning.

In another embodiment, the media customization program 110a, 110-b may monitor the changes to the user data while the user is playing the queried media selections. As such, the raw data may be enriched to include the effects that such media selections have on the user, and the user's status and cognitive status.

Then, at 210, the raw data is correlated by the media customization program 110a, 110-b. The media customization program 110a, 110-b further utilizes the Behavior Capture component to correlate the raw data to determine the media preferences of the user based on location, activity, mood, cognitive status, context and environmental conditions (i.e., the user listening behavior). The correlated raw data, which associates the queried songs with corresponding user data and data on external conditions, may be categorized and sent to the records of learned user preferences and behaviors database 212 to update and store the learned user listening behavior.

Continuing the previous example, the media customization program 110a, 110-b correlates the raw data on the external conditions that the user is sitting and typing at the user's office at work at eleven o'clock in the morning on Monday, Jun. 23, 2018, and the raw user data that the user's heartbeat rate and respiratory breathing are elevated, and the user is anxious, with the classical music, in particular songs composed by Mozart, Bach and Beethoven, queried by the user. The music queried and the raw data on the user and external conditions are stored in the records of learned user preferences and behaviors database 212 and utilized to update the user listening behavior. As such, next time that the same or similar raw data on the user and external conditions are received, the records of learned user preferences and behaviors database 212 (e.g., database 114) may recommend these particular songs composed by Mozart, Bach and Beethoven.

In another embodiment, the media customization program 110a, 110-b may select certain media selections, based on the raw data gathered by utilizing biometric sensors, to change the user's status. Raw data associated with the user reaction (e.g., relaxed, calm, increased anxiety, decreased frustration) to certain media selections may be correlated by the media customization program 110a, 110-b. The correlated raw data associated with the user reactions and the corresponding media selections may be categorized and sent to the records of learned user preferences and behaviors database 212 to update and store the learned user listening behavior. For example, if the media customization program 110a, 110-b monitors a decrease in heart rate when a user listens to classical music, then the media customization program 110a, 110-b may automatically select classical music when the user's heart rate is elevated.

Figure 3:
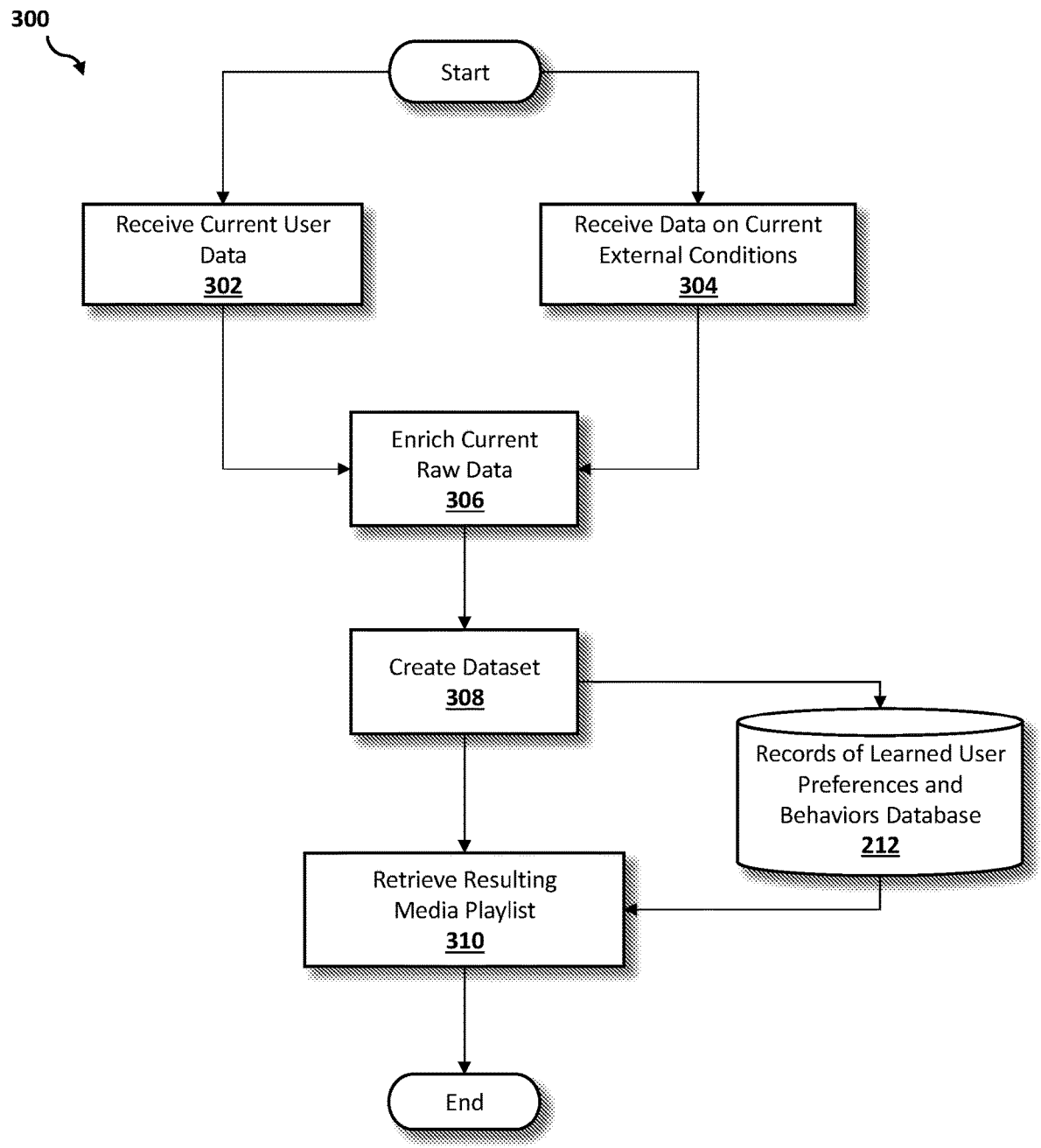
FIG. 3 is an operational flowchart illustrating a process for creating a customized playlist for a user according to at least one embodiment.

Referring now to FIG. 3, an operational flowchart illustrating the exemplary customized playlist creation process 300 used by the media customization program 110a, 110-b according to at least one embodiment is depicted.

At 302, current user data is received by the media customization program 110a, 110-b. Using a software program 108 on the user device (e.g., user's computer 102), current user data may be received as input, from wearable biometric sensors (e.g., watch, glasses), user gestures, user activity and/or recent social media posts, to the media customization program 110a, 110-b via communications network 116. The current user data may include information pertaining to the user's current mood, current activity and current cognitive status. For the user's current cognitive status, the media customization program 110a, 110-b may utilize wearable biometric sensors associated with the physiological recognition (e.g., face, hand, iris and fingerprint) and behavioral recognition (e.g., voice, heartbeat rate, breathing rate). For the user's current mood, the media customization program 110a, 110-b may utilize wearable biometric sensors associated with recognizing hand gestures and handwriting, as well as utilize recent social media posts associated with the user or by the user. To determine the user's current activity, the media customization program 110a, 110-b may utilize wearable accelerometer and gyroscope sensors associated with the user.

For example, a user is wearing augmented reality (AR) glasses and a fitness watch that transmits generated data to the user's smartphone. The AR glasses include biometric sensors to track iris or retina motion of the user, and accelerometer and gyroscope sensors to detect the motion of the user's body. The fitness watch includes biometric sensors on the user's pulse and respiratory breathing.

In another embodiment, the user may also manually input certain current user data into the media customization program 110a, 110-b, without the use of biometric sensors or recent social media posts in case of a malfunction or lack of certain biometric sensors.

In the present embodiment, if the media customization program 110a, 110-b is unable to detect current user data associated with the user's current cognitive status and current mood, then the media customization program 110a, 110-b may present an error message, guide the user to activate (i.e., turn on) a specific biometric sensor device, or present the identified malfunction (e.g., reason for the failure to detect) to the user. The media customization program 110a, 110-b may then continue to attempt to detect current user data until the media customization program 110a, 110-b receives the adequate current user data.

At 304, data on current external conditions is simultaneously received by the media customization program 110a, 110-b. Using a software program 108 on the user device (e.g., user's computer 102), data on current external conditions (i.e., current external conditions data) may be received as input, from wearable biometric sensors, application program interfaces (APIs) and/or recent social media posts, to the media customization program 110a, 110-b via communications network 116. The data on current external conditions may include information pertaining to the user's current location, current context (e.g., date and time), and current environmental conditions (e.g., weather and temperature). To determine the current location of the user, the media customization program 110a, 110-b may access GPS and other data location tracking services on the user device. To determine current context, the media customization program 110a, 110-b may utilize APIs on the user device. To determine current environmental conditions, the media customization program 110a, 110-b may utilize APIs, recent social media posts associated with the user or by the user, and weather data tracking services on the user device.

Continuing the previous example, the AR glasses and the user's smartphone include a GPS which determines the location, and several APIs on the smartphone determine the date, time and environmental conditions.

In another embodiment, the media customization program 110a, 110-b may receive current user data 302 and receive data on current external conditions 304 consecutively. For example, the media customization program 110a, 110-b may receive current user data 302 before the media customization program 110a, 110-b may receive data on current external conditions 304, or the media customization program 110a, 110-b may receive data on current external conditions 304 before the media customization program 110a, 110-b may receive current user data 302.

In another embodiment, the user may also manually input certain data on current external conditions into the media customization program 110a, 110-b, without the use of GPS, data tracking services, APIs or recent social media posts in case of a malfunction or the deactivation of data tracking services, APIs or GPS.

In the present embodiment, if the media customization program 110a, 110-b is unable to detect data on current external conditions associated with the user's current location, current context and current environmental conditions, then the media customization program 110a, 110-b may present an error message, guide the user to activate (i.e., turn on) a specific API, GPS or data tracking service, or present the identified malfunction (e.g., reason for the failure to detect) to the user. The media customization program 110a, 110-b may then continue to attempt to detect data on current external conditions until the media customization program 110a, 110-b receives the adequate data on current external conditions.

Then, at 306, the received data is enriched by the media customization program 110a, 110-b. The received current user data and data on current external conditions (i.e., current raw data) may be received from the various biometric sensors, APIs, GPS, data tracking services and media player on the user device by the extension, which may then send the current raw data to a Current Context Data Capture component to enrich the received current raw data associated with the current user data (e.g., user's cognitive status, activity and mood) and data on current external conditions (e.g., location, context and environmental conditions). By enriching the current raw data with the Current Context Data Capture component, the media customization program 110a, 110-b may interpret the current raw data by determining the current location (e.g., gym, coffee shop, work, home, park), current environmental conditions (e.g., wind, temperature, partly sunny skies, humidity), context (e.g., five o'clock in the afternoon on a weekday, early morning on a weekend), user's current activity (e.g., exercising, walking, sitting, riding a bicycle), current mood (e.g., expression) and current cognitive status (e.g., anxious, tired, happy).

Additionally, the media customization program 110a, 110-b may determine whether the current user data associated with the user's anatomical functions or systems are in distress or exceed a certain threshold (e.g., respiratory system, circulatory system, or digestive system) which may be indicated by elevated high blood pressure, respiratory breathing pace, heartbeat rate or frustration level. The threshold may be determined based on the user's personal data (e.g., age, gender). Alternatively, the threshold may be determined based on the biometric sensors and APIs associated with the media customization program 110a, 110-b regularly monitoring the anatomical functions and systems associated with the user, and therefore, notifying the media customization program 110a, 110-b of a change to the anatomical functions and systems associated with the user.

Continuing the previous example, the received raw data is enriched by the media customization program 110a, 110-b. The media customization program 110a, 110-b determines that the user is exercising in a local park. The weather is sunny with a mild breeze and a temperature of 62 degrees Fahrenheit. The current context is Sunday morning at six o'clock in the morning. The user's pulse and respiratory breathing is slightly elevated, and the user's cognitive status is happy.

Then, at 308, a dataset is created by the media customization program 110a, 110-b. The media customization program 110a, 110-b further utilizes the Current Context Data Capture component to create a dataset of the current user situation. The dataset may then be sent to a Customized Playlist Selection module, which may query the records of learned user preferences and behaviors database 212 for the media corresponding to the created dataset associated with the enriched current raw data on location, user's activity, user's mood, user's cognitive status, context and environmental conditions.

Alternatively, the media customization program 110a, 110-b may create a dataset based on the user reaction to a particular media selection. The Customized Playlist Selection module may be utilized to query the records of learned user preferences and behaviors database 212 for the media corresponding to the created dataset associated with the change in the anatomical functions or systems associated with the user, to retrieve media that may alleviate the change to the user's anatomical functions or systems.

Continuing the previous example, the media customization program 110a, 110-b creates a dataset with the current raw data that the user is happily exercising in a local park on a sunny Sunday at six o'clock in the morning with a slightly elevated pulse and respiratory breathing. The Customized Playlist Selection module searches through the records of learned user preferences and behaviors database 212 for a dataset with the same or similar raw data.

Then, at 310, the resulting media playlist is retrieved by the media customization program 110a, 110-b. After the media customization program 110a, 110-b searches the records of learned user preferences and behaviors database 212 and analyzes a combination of external factors (e.g., positioning activities) from digital devices (e.g., smartwatch) that may describe the activity the individual is performing, media titles suitable for the user's current situation may be returned. The media titles may then be sent to the extension, which may deliver the retrieved resulting media playlist (i.e., media playlist) to a device associated with the user (e.g., media player, a preferred application, preferred method of choice to listen to media that already contains a predetermination of the user's preferred types of media). The device associated with the user may then stream the retrieved media playlist to the user.

Continuing the previous example, the Customized Playlist Selection module retrieves a music playlist with a similar dataset for the current user situation. The corresponding music for the created dataset is the latest electronic dance music (EDM). Therefore, the media player on the user's smartphone streams the latest EDM hits for the user.

In the present embodiment, if the media customization program 110a, 110-b is unable to retrieve the resulting media playlist based on the created dataset associated with the enriched current raw data from the records of learned user preferences and behaviors database 212, then the records of learned user preferences and behaviors database 212 may provide songs that closely resemble (or are similar to) the user's current situation.

In another embodiment, if the retrieved media playlist fails to suit the user's current situation, then the user may provide feedback (manually or via biometric sensors) and request that the media customization program 110a, 110-b continue to search for a media playlist that may be better suited for the user's current situation. At the bottom of the screen on the media player on the user device, the media customization program 110a, 110-b may include a "Reject" button. If the user clicks on the "Reject" button, the media player may then query the Customized Playlist Selection module to continue to search for a better suited media playlist for the user's current situation. The Customized Playlist Selection module may then continue to search through the records of learned user preferences and behaviors database 212 for the appropriate media playlist for the user's current situation.

In another embodiment, the media customization program 110a, 110-b may be utilized to change the user status. The records of learned user preferences and behaviors database 212 may be utilized to learn the past behaviors of the user, including the user reaction to specific media selections. As such, biometric sensors may be utilized to monitor a change in user status when a specific music genre or specific media selection is played, and such user status (or user reaction) changes and corresponding media selections may be saved in the records of learned user preferences and behaviors database 212. When the user status exceeds a certain threshold, the corresponding media selection to change the user status may be played by the media customization program 110a, 110-b. For example, if the user's mood changes and the user relaxes when jazz music is played, when the user's heartbeat rate or pace of breathing exceeds a certain threshold the media customization program 110a, 110-b will automatically play jazz music to calm down the user until the user's heartbeat rate and pace of breathing returns to a normal rate for the user.

In another embodiment, the media customization program 110a, 110-b may be utilized to stream various forms of media selections (e.g., comedy clips, spoken word, news coverage) in audio form. Additionally, if the media customization program 110a, 110-b is connected to a computer display monitor, then the media customization program 110a, 110-b may stream visual selections (e.g., movies, media videos, social media clips) correlating to the raw data associated with the user and the external conditions. Since the default settings may be to stream audio selections (e.g., media), the user may have to manually change the settings to include visual selections. For example, a screen may appear in which, for example, a "Settings" button is located on the bottom right side. Once the user clicks on the "Settings" button, the user may be prompted (e.g., via dialog box) to indicate whether the user intends to change the settings with "Yes" and "No" buttons at the bottom of the dialog box. If the user clicks the "Yes" button, then the dialog box may expand for the user to change the settings to include visual selections, as well as audio selections.

In another embodiment, the media customization program 110a, 110-b may detect the computer display monitor connection. As such, the media customization program 110a, 110-b may prompt the user (e.g., via dialog box) to confirm that the user intends to include visual selections in the media customization program 110a, 110-b.

In another embodiment, the media customization program 110a, 110-b may automatically preclude playing a media selection to change the user status, when the user status returns to a normal range (or below the threshold). The media customization program 110a, 110-b may then resume with playing a media selection based on the current raw data associated with the user and the current external conditions and listening behavior of the user.

In another embodiment, the user may manually request that the media customization program 110a, 110-b continue to play a media selection to change the user status. When the media customization program 110a, 110-b is playing a media selection specifically focused on changing the user status, the screen or computer display monitor may include a "Customization" button at the bottom of the screen. The media customization program 110a, 110-b may then prompt (e.g., via a dialog box) the user to indicate whether the user intends to continue the previous media selection or resume a normal customization mode. If the user clicks the "Previous Selection" button, then the media customization program 110a, 110-b may continue to play a media selection to change the user status or maintain the normal (or below threshold) current user status.

In another embodiment, if the media customization program 110a, 110-b fails to detect a change in user status for a previously determined amount of time, then the media customization program 110a, 110-b may prompt or notify (e.g., via a dialog box) the user that the user status remains unchanged and is currently exceeding the threshold. The dialog box, for example, may include the anatomical function or system that is above the threshold, as well as the numeric value associated with the user status. For example, the dialog box will state that the heartbeat rate of the user is currently at 110 beats per minute and the normal range is 60 to 100 beats per minute. The media customization program 110a, 110-b may further prompt (e.g., via dialog box) the user to contact a medical professional if the condition persists.

Alternatively, the media customization program 110a, 110-b may be configured to contact a pre-determined person if the user's status fails to change within a specific period of time. The media customization program 110a, 110-b may be connected to a screen or computer display monitor. At the bottom of the screen, there is a "Settings" button. Once the user clicks on the "Settings" button, the user may be prompted (e.g., via dialog box) to indicate the setting that the user intends to change. In the list of settings, there may be an "Emergency Contact" button. If the user clicks the "Emergency Contact" button, then the dialog box may expand for the user to provide the name, relationship and telephone number associated with the emergency contact. The dialog box may expand and prompt the user to confirm the preferred emergency contact by clicking the "Yes" or "No" button under a statement restating the preferred emergency contact. Once the user clicks "Yes," the dialog box may disappear. If, however, the user selects the "No" button, then the dialog box may remain for the user to clarify the emergency contact information.

In another embodiment, the user may upload the emergency contact into the media customization program 110a, 110-b, if the user is utilizing a smartphone to run the media customization program 110a, 110-b.

Alternatively, the time allocated before the user is prompted to contact a medical professional or a pre-determined person may be configurable. The media customization program 110a, 110-b may be connected to a screen or computer display monitor. At the bottom of the screen, there is a "Settings" button. Once the user clicks on the "Settings" button, the user may be prompted (e.g., via dialog box) to indicate the setting that the user intends to change. In the list of settings, there may be a "User Status Time" button. If the user clicks the "User Status Time" button, then the dialog box may expand the list of possible times ranging from five minutes to 30 minutes in increments of five minutes. The user may select the preferred time. The dialog box may expand and prompt the user to confirm the preferred time by clicking the "Yes" or "No" button under a statement restating the preferred user status time. Once the user clicks "Yes," the dialog box may disappear. If, however, the user selects the "No" button, then the dialog box may remain for the user to clarify the preferred time. Additionally, the allotted time may be changed (e.g., shortened) depending on the type of anatomical function or system that is exceeding the threshold and by how much the user status exceeds the threshold.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
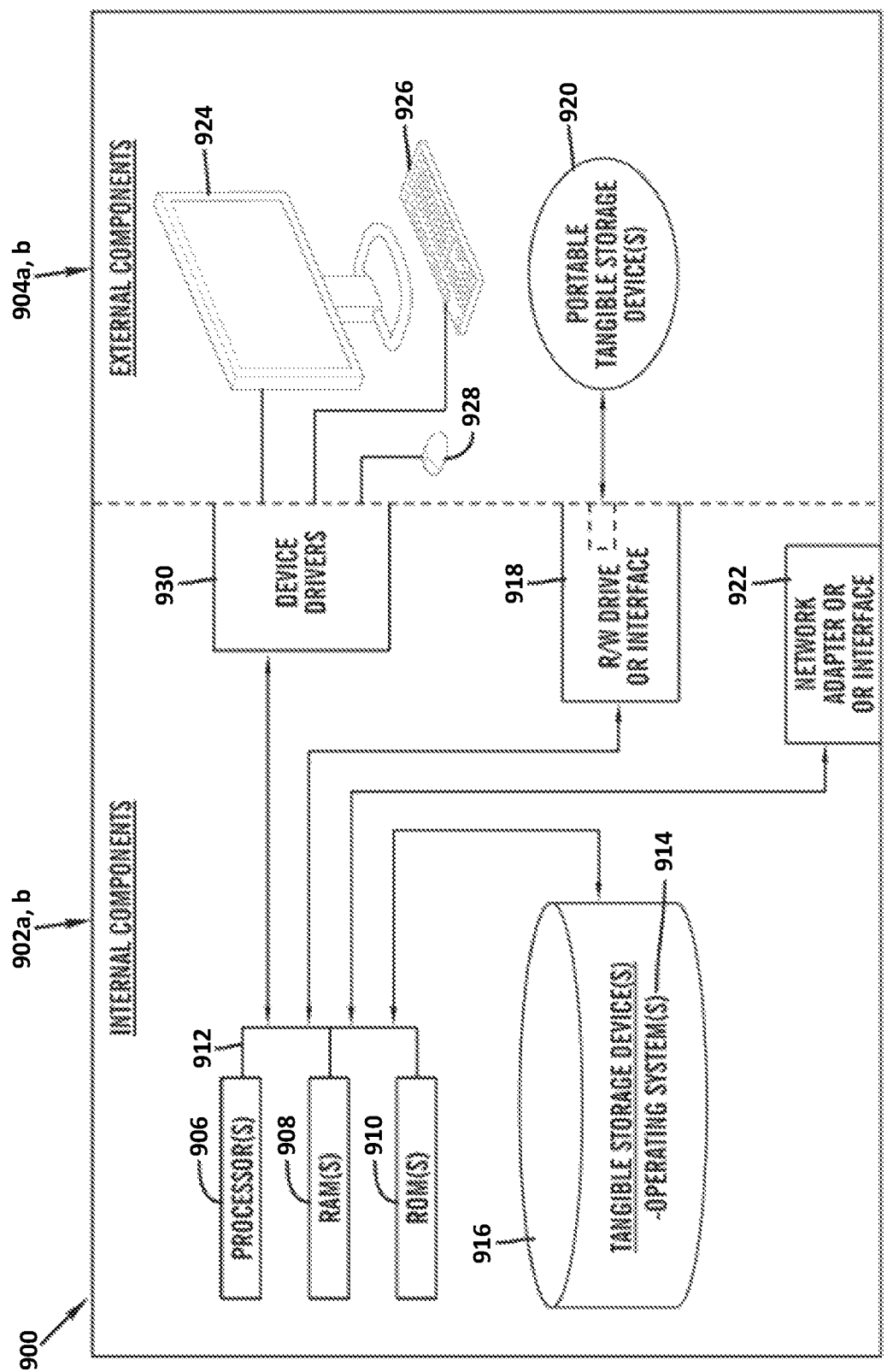
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smartphone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the media customization program 110a in client computer 102, and the media customization program 110-b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the media customization program 110a, 110-b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the media customization program 110a in client computer 102 and the media customization program 110-b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the media customization program 110a in client computer 102 and the media customization program 110-b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
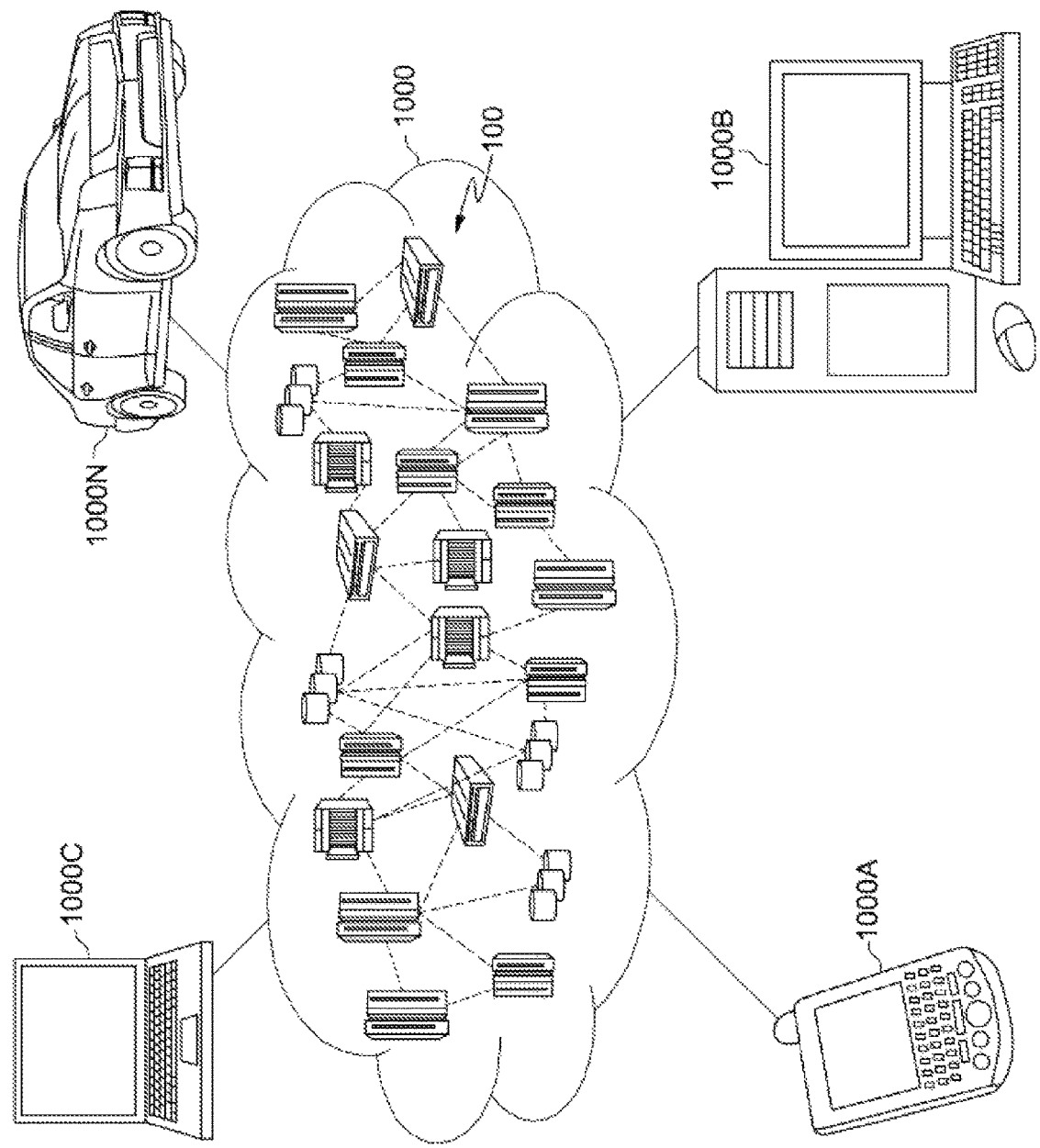
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
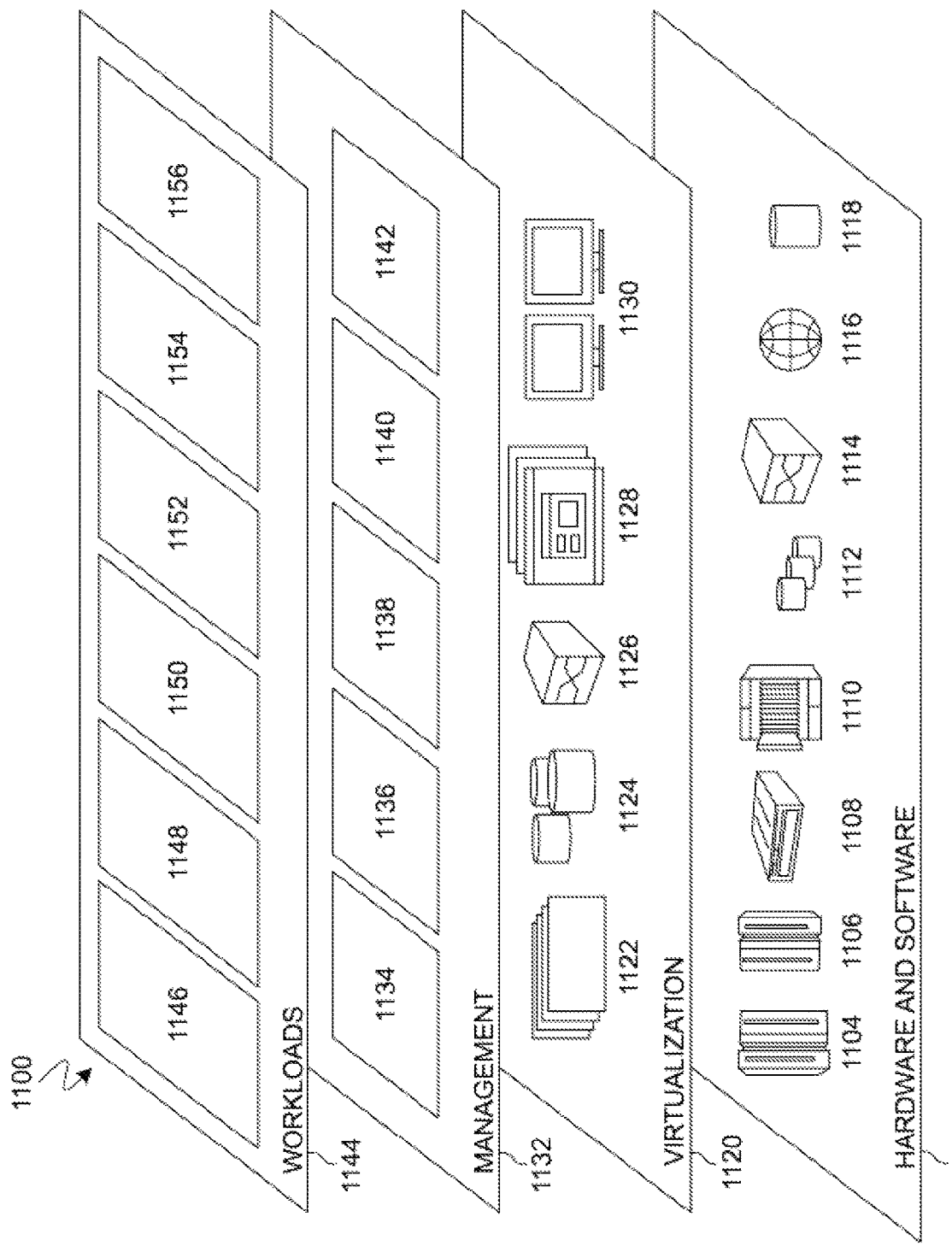
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and media customization 1156. A media customization program 110a, 110-b provides a way to customize a media playlist based on learning the past behavior of a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selecting a media playlist based on learning past behaviors of a user, the method comprising:

receiving a plurality of current user data associated with the user from a user device, wherein the received plurality of current user data associated with the user includes a plurality of user reaction data to a plurality of media selections corresponding with the user;

receiving a plurality of current external conditions data associated with the user from the user device;

enriching a plurality of current raw data associated with the received plurality of current user data, the received plurality of user reactions to the plurality of media selections and the received plurality of current external conditions data;

determining the received plurality of current user data exceeds a threshold associated with the user;

in response to determining that the received plurality of current user data exceeds the threshold, creating a dataset based on the determined plurality of current user data based on the exceeded threshold associated with the user;

retrieving, from a records of learned user preferences and behaviors database and a combination of external digital devices, a media playlist based on the determined plurality of current user data exceeding the threshold associated with the user, wherein the retrieved media playlist alters the received plurality of current user data;

sending the retrieved media playlist to a media device associated with the user;

receiving a plurality of training user data associated with the user from the user device;

receiving a plurality of training external conditions data associated with the user on the user device;

querying a plurality of media selections made by the user;

enriching a plurality of raw training data associated with the received plurality of training user data, the queried plurality of media selections, and the received plurality of training external conditions data;

correlating the enriched plurality of raw training data with the received plurality of training user data and the received plurality of training external conditions data to the queried plurality of media selections; and storing the correlated plurality of training user data and the correlated plurality of training external conditions data with the corresponding queried plurality of media selections in the records of learned user preferences and behaviors database.

2. The method of claim 1, further comprising:
determining that the retrieved media playlist fails to satisfy a user listening behavior;
searching the records of learned user preferences and behaviors database to identify an alternate media playlist;
retrieving the identified alternate media playlist, wherein the created dataset is utilized to match a user reaction with the retrieved alternate resulting media playlist; and
sending the identified alternate media playlist to the media player associated with the user.

3. The method of claim 1, further comprising:
monitoring a plurality of reactions by the user based on the queried plurality of media selections;
correlating the monitored plurality of reactions by the user to the corresponding queried plurality media selections; and
storing the correlated plurality of reactions by the user with the corresponding queried plurality of media selections in the records of learned user preferences and behaviors database.

4. The method of claim 3, wherein monitoring a plurality of reactions by the user based on the queried plurality of media selections, further comprises:
utilizing a plurality of biometric devices and a plurality of biometric sensors associated with the mood, frustration level, cognitive status and activity of the user, and a plurality of social media posts associated with the user.

5. The method of claim 1, wherein receiving the plurality of training user data associated with the user on the user device, further comprises:
utilizing a plurality of biometric devices and a plurality of biometric sensors associated with the mood, cognitive status and activity of the user.

6. The method of claim 1, wherein receiving the plurality of training external conditions data associated with the user on the user device, further comprises: utilizing a plurality of social media posts, a plurality of application program interfaces, and a plurality of data tracking services associated with the location, context and environmental conditions associated with the user.

7. A computer system for selecting a media playlist based on learning past behaviors of a user, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a plurality of current user data associated with the user from a user device, wherein the received plurality of current user data associated with the user includes a plurality of user reaction data to a plurality of media selections corresponding with the user;
receiving a plurality of current external conditions data associated with the user from the user device;
enriching a plurality of current raw data associated with the received plurality of current user data, the received plurality of user reactions to the plurality of media selections and the received plurality of current external conditions data;
determining the received plurality of current user data exceeds a threshold associated with the user;
in response to determining that the received plurality of current user data exceeds the threshold, creating a dataset based on the determined plurality of current user data based on the exceeded threshold associated with the user;
retrieving, from a records of learned user preferences and behaviors database and a combination of external digital devices, a media playlist based on the determined plurality of current user data exceeding the threshold associated with the user, wherein the retrieved media playlist alters the received plurality of current user data;
sending the retrieved media playlist to a media device associated with the user;
receiving a plurality of training user data associated with the user from the user device;
receiving a plurality of training external conditions data associated with the user on the user device;
querying a plurality of media selections made by the user;
enriching a plurality of raw training data associated with the received plurality of training user data, the queried plurality of media selections, and the received plurality of training external conditions data;
correlating the enriched plurality of raw training data with the received plurality of training user data and the received plurality of training external conditions data to the queried plurality of media selections; and
storing the correlated plurality of training user data and the correlated plurality of training external conditions data with the corresponding queried plurality of media selections in the records of learned user preferences and behaviors database.

8. The computer system of claim 7, further comprising:
determining that the retrieved media playlist fails to satisfy a user listening behavior;
searching the records of learned user preferences and behaviors database to identify an alternate media playlist;

retrieving the identified alternate media playlist, wherein the created dataset is utilized to match a user reaction with the retrieved alternate resulting media playlist; and sending the identified alternate media playlist to the media player associated with the user.

9. The computer system of claim 7, further comprising:

monitoring a plurality of reactions by the user based on the queried plurality of media selections;

correlating the monitored plurality of reactions by the user to the corresponding queried plurality media selections; and storing the correlated plurality of reactions by the user with the corresponding queried plurality of media selections in the records of learned user preferences and behaviors database.

10. The computer system of claim 9, wherein monitoring a plurality of reactions by the user based on the queried plurality of media selections, further comprises:

utilizing a plurality of biometric devices and a plurality of biometric sensors associated with the mood, frustration level, cognitive status and activity of the user, and a plurality of social media posts associated with the user.

11. The computer system of claim 7, wherein receiving the plurality of training user data associated with the user on the user device, further comprises:

utilizing a plurality of biometric devices and a plurality of biometric sensors associated with the mood, cognitive status and activity of the user.

12. The computer system of claim 7, wherein receiving the plurality of training external conditions data associated with the user on the user device, further comprises:

utilizing a plurality of social media posts, a plurality of application program interfaces, and a plurality of data tracking services associated with the location, context and environmental conditions associated with the user.

13. A computer program product for selecting a media playlist based on learning past behaviors of a user, comprising:

one or more computer-readable storage media and program instructions stored on at least one of the one or more tangible storage media, the program instructions executable by a processor to cause the processor to perform a method comprising:

receiving a plurality of current user data associated with the user from a user device, wherein the received plurality of current user data associated with the user includes a plurality of user reaction data to a plurality of media selections corresponding with the user;

receiving a plurality of current external conditions data associated with the user from the user device;

enriching a plurality of current raw data associated with the received plurality of current user data, the received plurality of user reactions to the plurality of media selections and the received plurality of current external conditions data;

determining the received plurality of current user data exceeds a threshold associated with the user;

in response to determining that the received plurality of current user data exceeds the threshold, creating a dataset based on the determined plurality of current user data based on the exceeded threshold associated with the user;

retrieving, from a records of learned user preferences and behaviors database and a combination of external digital devices, a media playlist based on the determined plurality of current user data exceeding the threshold associated with the user, wherein the retrieved media playlist alters the received plurality of current user data;

sending the retrieved media playlist to a media device associated with the user;

receiving a plurality of training user data associated with the user from the user device;

receiving a plurality of training external conditions data associated with the user on the user device;

querying a plurality of media selections made by the user;

enriching a plurality of raw training data associated with the received plurality of training user data, the queried plurality of media selections, and the received plurality of training external conditions data;

correlating the enriched plurality of raw training data with the received plurality of training user data and the received plurality of training external conditions data to the queried plurality of media selections; and storing the correlated plurality of training user data and the correlated plurality of training external conditions data with the corresponding queried plurality of media selections in the records of learned user preferences and behaviors database.

14. The computer program product of claim 13, further comprising:

determining that the retrieved media playlist fails to satisfy a user listening behavior;

searching the records of learned user preferences and behaviors database to identify an alternate media playlist;

retrieving the identified alternate media playlist, wherein the created dataset is utilized to match a user reaction with the retrieved alternate resulting media playlist; and sending the identified alternate media playlist to the media player associated with the user.

15. The computer program product of claim 13, further comprising:

monitoring a plurality of reactions by the user based on the queried plurality of media selections;

correlating the monitored plurality of reactions by the user to the corresponding queried plurality media selections; and storing the correlated plurality of reactions by the user with the corresponding queried plurality of media selections in the records of learned user preferences and behaviors database.

16. The computer program product of claim 13, wherein receiving the plurality of training user data associated with the user on the user device, further comprises:

utilizing a plurality of biometric devices and a plurality of biometric sensors associated with the mood, cognitive status and activity of the user.

17. The computer program product of claim 13, wherein receiving the plurality of training external conditions data associated with the user on the user device, further comprises:

utilizing a plurality of social media posts, a plurality of application program interfaces, and a plurality of data tracking services associated with the location, context and environmental conditions associated with the user.

* * * * *